United States Patent Office 2,881,082
Patented Apr. 7, 1959

2,881,082

MOLDING MATERIAL FOR PRODUCING SHELL MOLDS FOR CASTING PURPOSES

Manfred Lottermoser, Hamburg, Germany, assignor to Johannes Croning, Hamburg-Nienstedten, Germany; Elly Maria Dorothea Croning, born Bornsen, Hamburg-Nienstedten, Germany, sole heir of said Johannes Croning, deceased No Drawing. Application November 14, 1955
Serial No. 546,836

Claims priority, application Germany November 16, 1954

2 Claims. (Cl. 106—38.8)

The invention relates to a molding material for the production of shell molds for the purpose of casting, composed of mixtures of refractory, granular material and thermo-setting binding agents, and is characterized in that the thermo-setting binding agents consist of a mixture of one or more substances related to bitumen or components thereof and elementary sulphur.

In the recent methods of producing shell molds for the purpose of casting, a mixture capable of being sprinkled and composed of granular material (particularly quartz sand) and a thermo-setting binding agent is strewn on to a hot pattern plate. After being allowed to stand for a short period, the pattern plate is turned over when, on the one hand, a large percentage of the material previously strewn thereon falls off and becomes available for subsequent use and, on the other hand, a biscuit, composed of a mixture which is heated right through and has thus become sticky, remains adhering to the pattern. This biscuit is hardened completely on the pattern by the application of heat and is then removed from the pattern as a finished half-mold. Hollow cores for casting purposes are produced in a similar manner using the same molding batch.

Thermo-setting synthetic resins in solid or liquid state are chiefly used as binding agents for the production of the mixtures specified above. It has also been proposed to mix these thermo-setting synthetic resins with thermo-plastic materials, that are substances which remain plastic or liquid under heat and only set on cooling down. It is likewise known that di- and polyisocyanates mixed with reactive organic compounds, for example those which contain hydroxyl, sulphohydryl- or amino-groups in the molecule, can be used. Moreover, salts of high molecular poly-basic acids and di- or polyamines are suitable as thermo-setting binding agents.

A suggestion in another direction is to substitute for the whole of the thermo-setting binding agent thermo-plastic substances. Thermo-plastic synthetic resins and also distilled and blown bitumens, these are "bitumens in the narrower sense," are mentioned amongst other substances as examples of thermo-plasic substances. (Bitumens in the narrower sense are distillation residues from mineral oils.) The actual relationship of these substances can only exist to the extent that these substances also possess thermo-setting properties in that the thermo-plastic substances can, so to speak, set on being over-heated, because, either by chemical decomposition or partial carbonisation or giving off components becoming volatile under heat or by several of these processes, they at the same time leave behind them solid residues which possess a certain degree of strength.

These quasi-setting properties are, however, in the case of bitumens in the narrower sense, so unfavorable that they cannot be used for the above-mentioned purpose. If it is desired to compel the naturally thermo-plastic bitumens in the narrower sense to undergo a quasi-setting process, they must either be subjected to temperatures which are so high that they are not practicable without damaging the patterns or the heat treatment at normal temperatures must be carried out for such a long period that there could be no question of the process being economical.

In view of these facts the invention consists in using as thermo-setting binding agent a mixture of one or more bitumen-related substances or components thereof and elementary sulphur. The bitumen-related substances are obtained from natural products by destructive distillation and therefore, according to the definition decided upon by the expert group for fuel and mineral oil chemistry in the Verein Deutscher Chemiker (Association of German Chemists), come neither under bitumens in the wider sense nor under bitumens in the narrower sense. Moreover, according to the draft for uniform nomenclature of these substances drawn up by the Deutscher Normausschuss (German Standards Committee) in consultation with the DVM and the Deutsche Gesellschaft für Mineralölforschung (German Society for Mineral Oil Research), a distinction is drawn between bitumens in the wider sense on the one hand and to which the already proposed, above-mentioned bitumens in the narrower sense belong, and the related substances on the other hand belong, which include the first-mentioned components of the mixtures claimed. Lignite tars, lignite tar pitches, slate tars, slate tar pitches, coal tars, coal tar pitches and the like come into question as bitumen-related substances.

The thermo-setting of the binding agent mixture according to the invention is based chiefly on a chemical reaction of the sulphur with the bitumen-related substances or their components. The molding batch can be produced by working the granular material in suitable kneading or stirring apparatus, if necessary under the application of heat, with one or more of the first-mentioned components of the mixture claimed until the grains have become uniformly coated with these substances and the whole material has become homogeneous. When the material has become sufficiently solid by cooling down, it is subjected, after the addition of possibly powdered sulphur, to frictional grinding treatment until a material which can be strewn is produced. During this treatment no reaction takes place between the bitumen-related substances or their components and the sulphur. The sulphur serves, in addition to its main objection of entering into chemical reaction with the first-mentioned components of the mixture claimed during the thermo-setting operation on the pattern, to prevent the coated grains from sticking together or caking during the grinding process. In carrying out this function the sulphur can be assisted by adding talc, rock flour or similar substances. The mixtures produced in this manner possess the great advantage as compared with the known above-mentioned mixture, of greater economy and the best possible freedom from dust.

Another advantage attained by the mixtures produced with the components claimed is that it is possible by suitably dosing the sulphur and by a suitable combination of the first-mentioned components, to vary the temperatures at which the casting molds become brittle to a wider extent than is possible when using mixtures hitherto known. For example it is possible to produce with the mixtures claimed, cores which at first possess the necessary strength but which after casting low-melting metals, are sufficiently fragile to enable them to be removed easily from the casting.

The following are examples for carrying out the process above described.

100 parts by weight of fine quartz-sand with a moisture content of not more than 5% are worked up in a sand mixer at a temperature of 100 to 160° C. with 10 parts by weight of stearic pitch having a Kraemer-Sarnow melting point of about 60° C. until complete homogeneousness is obtained. After allowing to cool down to room temperature, the mass is ground by a ball mill with 2.5 parts by weight of sulphur and 0.5 part by weight of talc until a powder capable of being strewn is formed.

It is also possible to produce the molding batch by the usual methods, according to which dry quartz-sand is mixed with finely powdered mixtures of bitumen-related substances or the components thereof with elementary sulphur. In this connection the following examples are given:

(1) 10 parts by weight of split-hard stearic pitch with the addition of 2.5 parts by weight of sulphur and 5 parts by weight of talc are ground to a powder and subsequently mixed with 100 parts by weight of thoroughly dried and cooled quartz-sand.

(2) 100 parts by weight of split-hard stearic pitch are fused with 4.5 parts by weight of lime and, after cooling, are ground by a ball mill with 25 parts by weight of sulphur. Then 1400 parts by weight fine, sharply dried and cooled quartz-sand are mixed with the composition.

(3) 100 parts by weight of colophony-pitch are ground with 35 parts by weight of sulphur and mixed with 1300 parts by weight of fine, thoroughly dried and cooled quartz-sand.

(4) 8.5 parts by weight of sulfite-cellulose pitch (Kraemer-Sarnow melting point 25° C., iodine number about 70, saponification number about 100) are melted with 28 parts by weight of calcium hydroxide and, after cooling, are ground with 20 to 35 parts by weight of sulphur. The whole is then mixed with fine, dry and cool quartz-sand.

In the last mentioned examples of application the chemical reaction between the bitumen-related substances mentioned and the sulphur only takes place the moment the molding material on the pattern is subjected to the thermo-setting process.

It is apparent from the above examples that the ratio of sulphur to the tar or pitch is approximately 1 to 4 by weight and that the percentage of the mixture of sulphur and tar or pitch to the refractory material is approximately from 8% to 10% by weight.

I claim:

1. A molding material for the manufacture of shell molds for casting purposes, said material consisting of an unreacted mixture of the following substances in pulverulent form and capable of being strewn: a granular refractory material, a substance selected from the class consisting of tars and pitches, and elementary sulphur, the ratio of sulphur to said substance being approximately 1 to 4 by weight and the percentage of the mixture of sulphur and said substance to said refractory material being approximately from 8% to 10% by weight.

2. In the manufacture of shell molds for casting purposes, the process of producing a molding material, which consists of the steps of coating a granular refractory material with a substance selected from the class consisting of tars and pitches under the application of heat, and then grinding it while adding elementary sulphur thereto at a ratio of sulphur to said substance of approximately 1 to 4 by weight.

References Cited in the file of this patent

UNITED STATES PATENTS

| | | |
|---|---|---|
| 403,548 | Olsen et al. | May 21, 1889 |
| 407,271 | Woodward | July 16, 1889 |
| 1,221,259 | Woddrop | Apr. 3, 1917 |
| 1,264,932 | Henderson | May 7, 1918 |
| 2,327,173 | Carson et al. | Aug. 17, 1943 |
| 2,558,402 | Wallace | June 26, 1951 |
| 2,640,787 | Greaves et al. | June 2, 1953 |
| 2,644,741 | King et al. | July 7, 1953 |

OTHER REFERENCES

Abraham: "Asphalts and Allied Substances," 5th ed., publ., 1945, by Van Nostrand, vol. 1, pp. 66 and 67.

Searle: "Refractory Materials," 2nd ed., 1924, pub., Griffin & Co., London, page 163.